Figure 1:
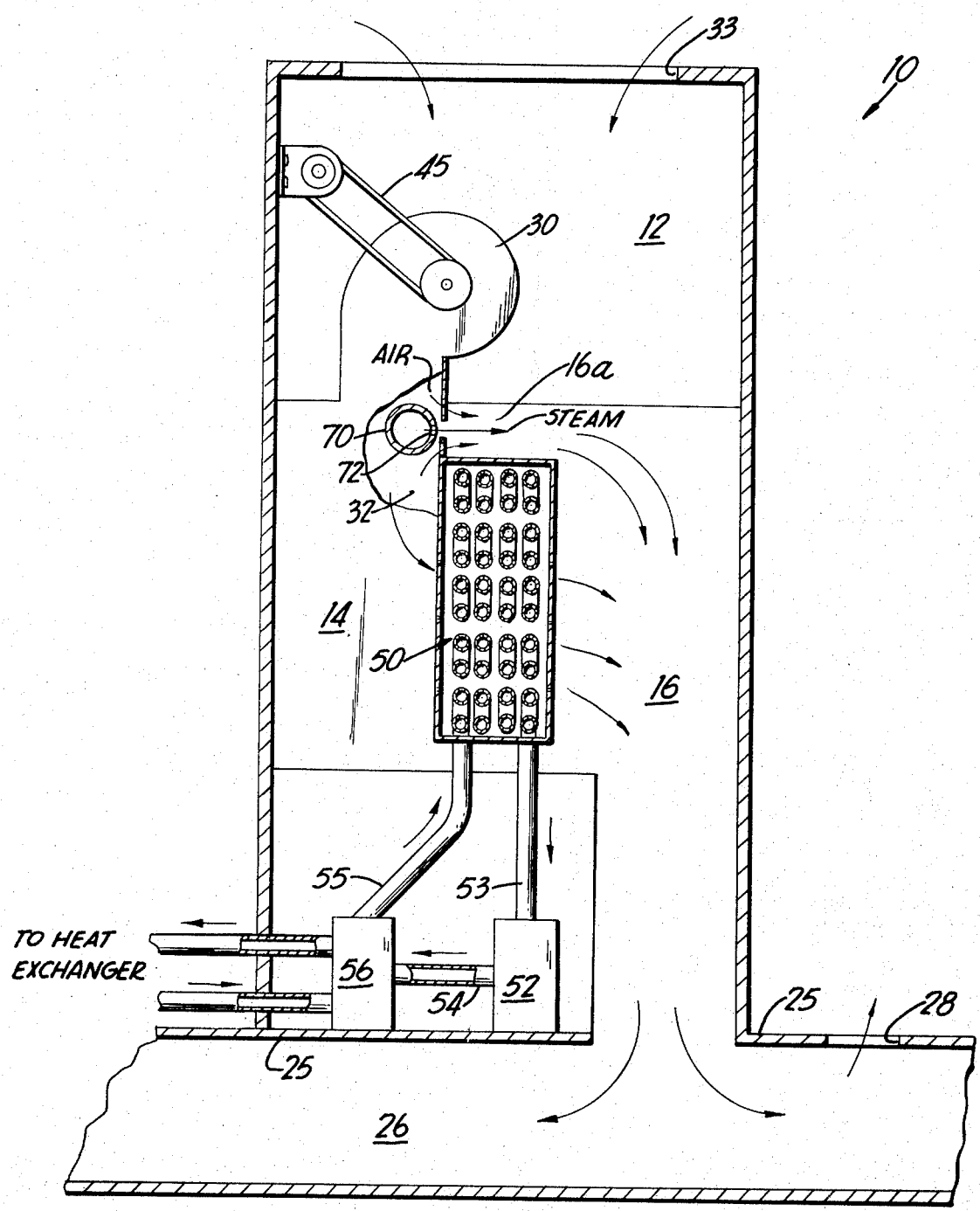

United States Patent
El-Tahry

[15] 3,670,809
[45] June 20, 1972

[54] ENVIRONMENT CONDITIONING APPARATUS

[72] Inventor: Mahmoud S. El-Tahry, Passaic, N.J.
[73] Assignee: Blazer Corporation, East Rutherford, N.J.
[22] Filed: May 21, 1970
[21] Appl. No.: 39,268

[52] U.S. Cl................................165/60, 165/103
[51] Int. Cl..............................................F24f 3/14
[58] Field of Search.................................165/60, 103

[56] References Cited

UNITED STATES PATENTS 2,041,870  5/1936  Sheffield............................165/60 X
3,534,810  10/1970  Limoni...............................165/60 X

FOREIGN PATENTS OR APPLICATIONS 937,830  8/1962  Great Britain............................165/6

Primary Examiner—John J. Camby
Attorney—Stephen B. Judlowe

[57] ABSTRACT

Computer environment conditioning apparatus employs a first air flow path for recirculating air through an evaporative cooling element for cooling purposes. A portion of the incident air flow is diverted to a by-pass duct where water vapor is added thereto, the initially dry air readily accepting the vapor. The cooled and humidified air flow streams are then combined, and discharged into the controlled environment. The humidifying operation is reliably and efficiently accomplished without regard to the operative status of the cooling equipment.

5 Claims, 2 Drawing Figures

INVENTOR.
MAHMOUD S. EL-TAHRY

INVENTOR.
MAHMOUD S. EL-TAHRY

ENVIRONMENT CONDITIONING APPARATUS

This invention relates to environmental regulation and, more specifically, to apparatus for maintaining the temperature and humidity of a controlled volume, e.g., a computation center, within desired bounds.

As has long been recognized, electronic data processing equipment operates most reliably when the surrounding environment is closely controlled as to temperature and humidity. Accordingly, prior art apparatus has included a fan and heat exchange cooling coil which supplies cooled air to a computer center directly and/or via a subflooring channel. A humidifier is included to inject water vapor into the input air stream as required.

Existing computer room conditioning apparatus encounters difficulty in maintaining the humidity level when a heavy thermal load is present, and thus when cooling and humidification must be simultaneously effected. In particular, the air exiting from a cooling coil is nearly saturated with water vapor. Thus, water vapor cannot realistically be inserted by passing the saturated cooled air flow through a humidifying station.

Correspondingly, the input air flow from the computer ambient medium is typically in an unsaturated state. Thus, existing computer air conditioning equipment positions humidifying apparatus upstream of the cooling coil where water vapor can be inserted in the passing air flow. However, when the humidified air passes through an active coil, most of the added humidity condenses out of the air stream. Thus, there is very little humidity added to the air flow during each air cycle through the apparatus for a correspondingly large input energy expenditure.

It is thus an object of the present invention to provide improved environmental conditioning apparatus.

More specifically, an object of the present invention is the provision of environmental conditioning apparatus for simultaneously effecting air cooling and humidifying operations in an efficient manner.

The above and other objects of the present invention are realized in a specific, illustrative computer area conditioning system employing an air duct having a heat exchanging evaporative cooling coil and a motor driven blower fan at the ends thereof. During an operative cooling cycle, the fan moves room air into and through the duct and coil.

To effect humidification independent of the operative state of the cooling apparatus, a portion of the incident air flow drawn into the composite air conditioning apparatus is diverted to a by-pass duct which discharges air into a common volume with the output air flow from the cooling coil. A source of water vapor communicates with the relatively dry diverted air flow in the by-pass duct to readily increase the humidity thereof. The mixed output from the cooling and humidifying air paths is cooler vis-a-vis the ambient computer environment, and also conveys the desired moisture to the ambient medium.

Figure 2:
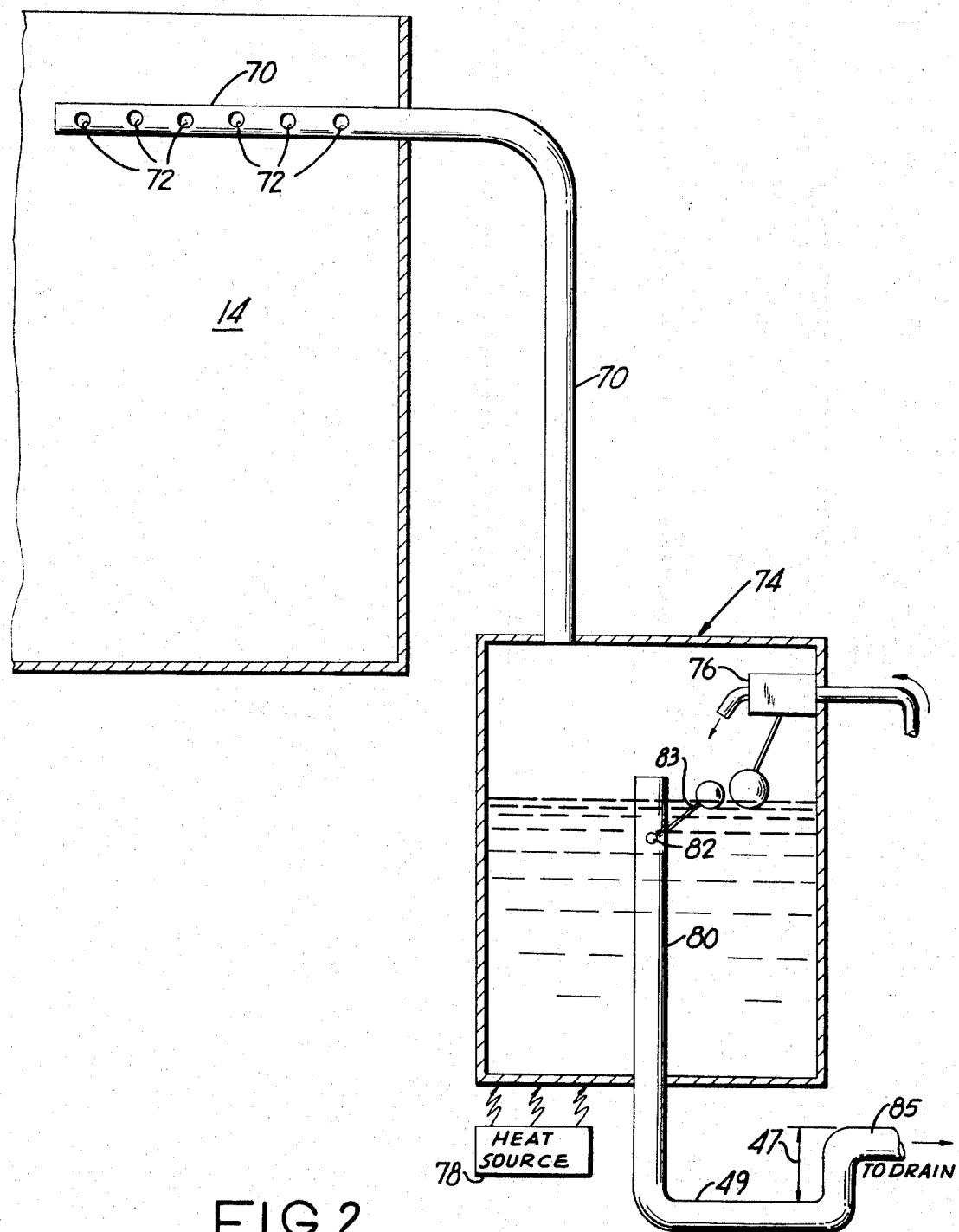

A complete understanding of the present invention, and of the above and other features and advantages thereof, may be gained from a consideration of the following detailed description of an illustrative embodiment thereof presented hereinbelow in conjunction with the accompanying drawing, in which:

FIG. 1 is a schematic cross-sectional view of an illustrative air conditioning arrangement employing the principles of the present invention; and FIG. 2 depicts in schematic cross-sectional view water vapor supplying apparatus for the arrangement of FIG. 1.

Referring now to FIG. 1, there is shown air conditioning apparatus 10 for controlling the temperature, humidity and waste particle content of a surrounding environment, e.g., adapted for computer usage. The arrangement comprises a first chamber 12 having an air input grill 33, preferably including an air filter, and including therein an air circulating centrifugal blower fan 30 coupled by a belt 45 to a fan driving motor 40. The fan 30 drives air via a fan output port 32 into and through a chamber 14, the air exiting from the chamber 14 either through a series of holes 15 in one wall thereof 14 or by way of an evaporative cooling coil 50 for the purposes discussed below.

An air discharge duct 16 is included in the structure 10 and connected to the chamber 14 by way of the holes 15, and also through the heat exchanging cooling element 50. The cooling coil 50, well known to those skilled in the art, includes a continuous run of piping having a refrigerant, e.g., Freon (a trademark of the DuPont Corporation for such a material), chilled water or glycol, or the like passing therethrough. Vaporized refrigerant exiting from the coil 50 is supplied by a conduit 53 to a compressor 52 for pressurized liquification, and passes to a condenser 56 through a tube 54 for cooling, with heat passing from the condenser to a remote heat exchanger such as an evaporative cooling tower. The relatively cooled liquid refrigerant is returned under pressure to the cooling coil 50 by way of a conduit 55.

The coil 50, and its ancillary structure 52-53-54-55-56 form a conventional cooling arrangement for cooling air as it passes through the coil from the chamber 14 to the output duct 16 under urging of the fan 30. In brief, relatively cooled, liquified refrigerant is vaporized by throttling valves at the input to the coil 50. The gaseous refrigerant is then liquified under pressure in the compressor 52, cooled in the condenser 56 and returned to the coil 50. As air passes through the coil 50, the quantum of heat energy given by the heat vaporization of the evaporated refrigerant is removed from the air which is thereby cooled.

To humidify the processed air independent of the operative state of the cooling apparatus, steam (water vapor) is supplied to a header conduit 70 which passes through the air duct 14. The conduit 70 includes a plurality of apertures 72 which are oriented toward the holes 15 in the side wall of the duct 14. The stem is supplied via a boiler tank 74 which contains water heated to boiling by a heat source 78 of any construction. The water in the tank 74 is maintained at a desired level by any conventional apparatus, e.g., a float valve 76.

The heated, steam supplying apparatus exhibits an elevated internal pressure, considered in more detail hereinbelow, such that the steam overcomes the static pressure at the outlet fan 30 port 32 and exits from the relatively small holes 72 in the lateral header 70 with significant velocity. The steam flows through the holes 15 in the side wall of the chamber 14 into the upper portion 16a of an air discharging and by-pass duct 16, as does a portion of the input ambient air flow (e.g., about 8 percent) under the urging of the static pressure of the blower 30. The vapor and ambient air mix in the duct area 16a, thereby readily increasing the humidity of the initially relatively dry air.

The cooled air from the output of the coil 50, and the humidified air from the by-pass duct portion 16a, mix in the lower portion of the duct 16. The composite conditioned air exiting from the duct 16 is thus both cooled and humidified. Moreover, the cooling and humidifying operations are both performed efficiently, there being no energy wasted in evaporating water for humidifying, only to expand additional energy in condensing out the added moisture during a subsequent cooling cycle.

When used in conjunction with computer installations having raised floorings, such as shown in the drawing, the conditioned air passes from the duct 16 into a channel 26 between a raised floor 25 and subflooring 27. The air then flows into the controlled volume by way of a plurality of grills 28. Alternatively, direct air discharge, or a combination of direct and subfloor delivery systems may be employed.

With regard to the water vapor delivery system, a trap conduit 49 has one end in the boiler tank 74, and its other end connected to a drain pipe 85. The water level is initially the same in both vertical sections of the conduit 49. As heat is applied to the contents of the boiler 74 by the source 78, and the water boils, the steam pressure increases in the top portion of the boiler and in the header 70 until sufficient pressure exits to overcome the static fan 30 pressure and force steam out of the holes 72 and into the by-pass chamber 16a. This steam system overpressure forces water downward on the boiler side of the trap 49 relative to that on the drain side, until the height differential (water "head") balances the steam pressure. The drain side of the conduit 49 may be completely filled.

If the apertures 72 should become smaller, as by retaining some foreign matter, the system pressure automatically increases, thereby maintaining the moisture flow into the humidifier by-pass duct portion 16a, with a corresponding increase in the water head being developed in the conduit 49. The conduit 49 serves a system overpressure function by limiting the maximum system pressure to its maximum head, i.e., that indicated at 47 in FIG. 2.

Finally, the conduit 49 includes a standpipe section 80 with a bleed orifice 82 disposed somewhat beneath the normal water level, e.g., one inch therebelow. Water is continuously removed from the tank 74 via the orifice 82 to prevent concentrations of water impurities from building up in the tank 72 as water is evaporated. Such accumulations would otherwise increase the boiling point of the water in the tank 74, give rise to possible heater failures due to overheating, and also accumulate as sludge materials in the system which would require more frequent shutdown for cleaning purposes. Further, a wire 83 and an attached float 84 may be stationed in the orifice 82 and agitated by the boiling water to keep the orifice free of foreign matter.

The arrangement shown in the drawing has thus been shown by the above to reliably and efficiently humidify a controlled environment notwithstanding the operational status of attendant cooling equipment.

It is to be understood that the above-described arrangement is merely illustrative of the principles of the present invention. Numerous modifications and adaptations thereof will be readily apparent to those skilled in the art without departing from the spirit and scope of the present invention. For example, sensors may be employed to selectively actuate the cooling and humidifying apparatus dependent upon the temperature and relative humidity characterizing the controlled environment.

What is claimed is:

1. In combination in apparatus for humidifying and cooling an associated environment, first duct means, air cooling means for cooling air flowing through said first duct, blower means for moving air through said first duct and said cooling means, by-pass duct means including a first inlet port communicating with the interior of said first duct for passing a portion of said air in said first duct means through said second duct means, a second inlet port for receiving air from the output of said cooling means, and at least one air discharge port, and means for supplying water vapor to said by-pass duct means, said by-pass duct means including a direct portion wherein said water vapor supplied to said by-pass duct means mixes with, and becomes retained in said air supplied to said by-pass duct means, substantially all humidification effected by said apparatus occurring in said by-pass duct means.

2. A combination as in claim 1 wherein said water vapor supplying means comprises a header conduit having plural apertures disposed toward the interior of said by-pass duct means.

3. A combination as in claim 2 further comprising means for mounting said header conduit in said first duct means.

4. In combination in apparatus for humidifying and cooling an associated environment, first duct means, air cooling means for cooling air flowing through said first duct, blower means for moving air through said first duct and said cooling means, by-pass duct means including a first inlet port communicating with the interior of said first duct for passing a portion of said air in said first duct means through said second duct means, a second inlet port for receiving air from the output of said cooling means, and at least one air discharge port, and means for supplying water vapor to said by-pass duct means, wherein said water vapor supplying means includes a boiler including water therein, means for maintaining said water at a predetermined level, heat supplying means for boiling said water, and water trap conduit means having one side thereof disposed within said boiler.

5. A combination as in claim 4 further comprising pipe means within said boiler, an orifice in said pipe disposed under the water level, and a wire disposed within said orifice and adapted to move responsive to motion of the heated water.

* * * * *